United States Patent [19]

Strong, III et al.

[11] Patent Number: 5,559,510
[45] Date of Patent: Sep. 24, 1996

[54] AIRCRAFT LANDING SITE INDICATION AND LIGHT

[75] Inventors: Maurice L. Strong, III, Wheeling; Charles J. Tranchita, Glen Ellyn, both of Ill.; Christopher R. Welch, Atlantic, Ga.; Gerald Griffith, Western Springs, Ill.

[73] Assignee: Northrop Grumman Corporation, Los Angeles, Calif.

[21] Appl. No.: 421,716

[22] Filed: Apr. 12, 1995

[51] Int. Cl.⁶ ........................................... B64F 1/20
[52] U.S. Cl. .......................... 340/954; 340/952; 340/953; 340/955
[58] Field of Search ..................... 340/952, 953, 340/954, 955

[56] References Cited

U.S. PATENT DOCUMENTS

| | | | |
|---|---|---|---|
| 2,797,367 | 6/1957 | Scott et al. | 315/162 |
| 3,519,984 | 7/1970 | Zychal | 340/953 |
| 4,272,799 | 6/1981 | Downing | 362/145 |
| 4,346,430 | 8/1982 | Holland | 362/62 |
| 4,477,796 | 10/1984 | Kearsley | 340/331 |
| 4,768,136 | 8/1988 | Tashjian | 362/84 |
| 4,827,245 | 5/1989 | Lipman | 340/321 |
| 4,862,164 | 8/1989 | Coley et al. | 340/952 |
| 4,866,450 | 9/1989 | Chisholm | 342/410 |

*Primary Examiner*—Glen Swann
*Attorney, Agent, or Firm*—Terry J. Anderson; Karl J. Hoch, Jr.

[57] ABSTRACT

A light unit has a strobe operated flash tube and a non-strobe peripheral lamp immediately beneath the flash tube; a switch can turn the unit off, operate either light or enable the pilot of an aircraft to signal the light unit to operate the flash tube or to turn off the flash tube and operate the non-strobe peripheral lamp, by means of a radio receiver having a local oscillator midway between two standard distress frequencies. The light unit may have infrared or other color lenses. A ribbon assists establishing a pattern of light and/or colors to mark a landing site and indicate wind direction.

16 Claims, 4 Drawing Sheets

AIRCRAFT LANDING SITE INDICATION AND LIGHT

TECHNICAL FIELD

This invention relates to assisting an aircraft in locating a landing site and indicating wind direction, and to a portable light useful therefor and for other purposes.

BACKGROUND ART

It is common to use helicopters for evacuation of injured persons from the site of a vehicle accident, a fire, or other disaster. It is also common to use helicopters for evacuation of persons lost in the wild, who have been located by a rescue party. It is not uncommon for helicopters to have difficulty with landing at these sites, which are less than ideal, even to the extent of crashing. Further, having landed in an inappropriate fashion, the helicopter may have difficulty taking off due to a combination of wind conditions and local obstacles, and the like. One problem is knowledge of wind direction. Another problem is locating the site, particularly at night, when there may be all sorts of conflicting light patterns rendering the detection of a rescue team or other emergency personnel from the air very difficult. In some cases, the use of a helicopter in covert operations, such as to evacuate an observation team or other agents may compound the problem by requiring that any assistance given to the helicopter not provide any indication of the presence of the evacuees to unfriendly or unauthorized personnel.

DISCLOSURE OF INVENTION

Objects of the invention include assisting a helicopter in locating a landing site, both in the daytime and at night, covertly, if necessary; indicating to a helicopter the wind direction at a landing site; providing a light unit, useful for identifying aircraft landing sites and other similar purposes, which is rugged, portable and compatible with aircraft operations, and which can be used covertly.

According to the present invention, a portable light unit useful for indicating a landing site to an aircraft has a strobe light (flash tube) at the top and a non-strobe peripheral or ring lamp immediately therebeneath; radio responsive circuitry allows a pilot to transmit pulses to cause the flash lamp to flash repetitively, and thereafter to cause the flash lamp to turn off and the non-strobe peripheral lamp to turn on. The light unit has a timer to cause both lights to be off ten minutes after the last transmission from the aircraft, thereby to conserve battery power. A switch allows turning the light unit off, enabling operation by the pilot, operating the flash tube or operating the non-strobe peripheral lamp.

According further to the invention, the light unit may be readily attached to a mounting plate which facilitates fastening the light unit in place, either by straps to brush or structures, by spikes into the ground, or by adhesive to firm surfaces. According to the invention further, the flash tube and peripheral lamp may be provided with infrared lenses to assist covert operations by restricting visibility to those using night vision goggles or infrared imaging systems. In still further accord with the invention, colored Lexan lenses may be used to give the flash lamps a desired color characteristic and/or to create a pattern.

In accordance with the invention further, the radio responsive circuitry for operating the lights includes a radio receiver having a local oscillator that operates at a frequency which is midway between two standard distress frequencies, whereby the light unit can be operated simply by the pilot keying his transmitter microphone when the transmitter is set to either of said emergency frequencies. This feature of the invention provides a measure of universality, since all aircraft must be capable of operating on one of the standard emergency frequencies.

According to the invention still further, the light unit of the invention may be utilized together with a pattern layout ribbon to create a particular pattern at a landing site, said pattern indicating wind direction so as to assist the pilot in orienting the aircraft for a landing. In accordance with the invention still further, the pattern may be emphasized by use of different colored lights for different portions thereof.

According to the invention further, the pattern may consist of only three or four lights having at least one light of a color different from others so as to indicate wind direction.

According further to the invention, a kit comprises a carrying case containing a number of light units and accompanying mounting plates, a pattern layout ribbon, and instruction sheet, together with adhesive, pins, and/or straps with which the mounting plates may be secured in a desired position.

If desired, the invention may be used with a portable global positioning satellite receiver so as to identify GPS coordinates to the ground team, for transmission to the pilot of an incoming aircraft. The kit may optionally also include a preset frequency transmitter to assist a pilot in locating the landing site.

The light units of the present invention may be used to mark obstacles, such as utility poles and the like, in the vicinity of a landing site, or otherwise, in which case straps might be most useful in securing a mounting plate to or near the obstacle.

The pattern ribbon may be in the shape of a wye, having a stem and branches; or, three pieces of ribbon may be loosely joined at one point so as to permit personnel to arrange the three pieces in a wye, with the stem and branches coming together at the joint. Alternatively, a single piece of ribbon or the like which is defined herein to include other material such as rope or cable, or any other portable structure or measure which can be used to indicate the desired lengths of the stem and the branches, may be used when laying out the light units in a pattern.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
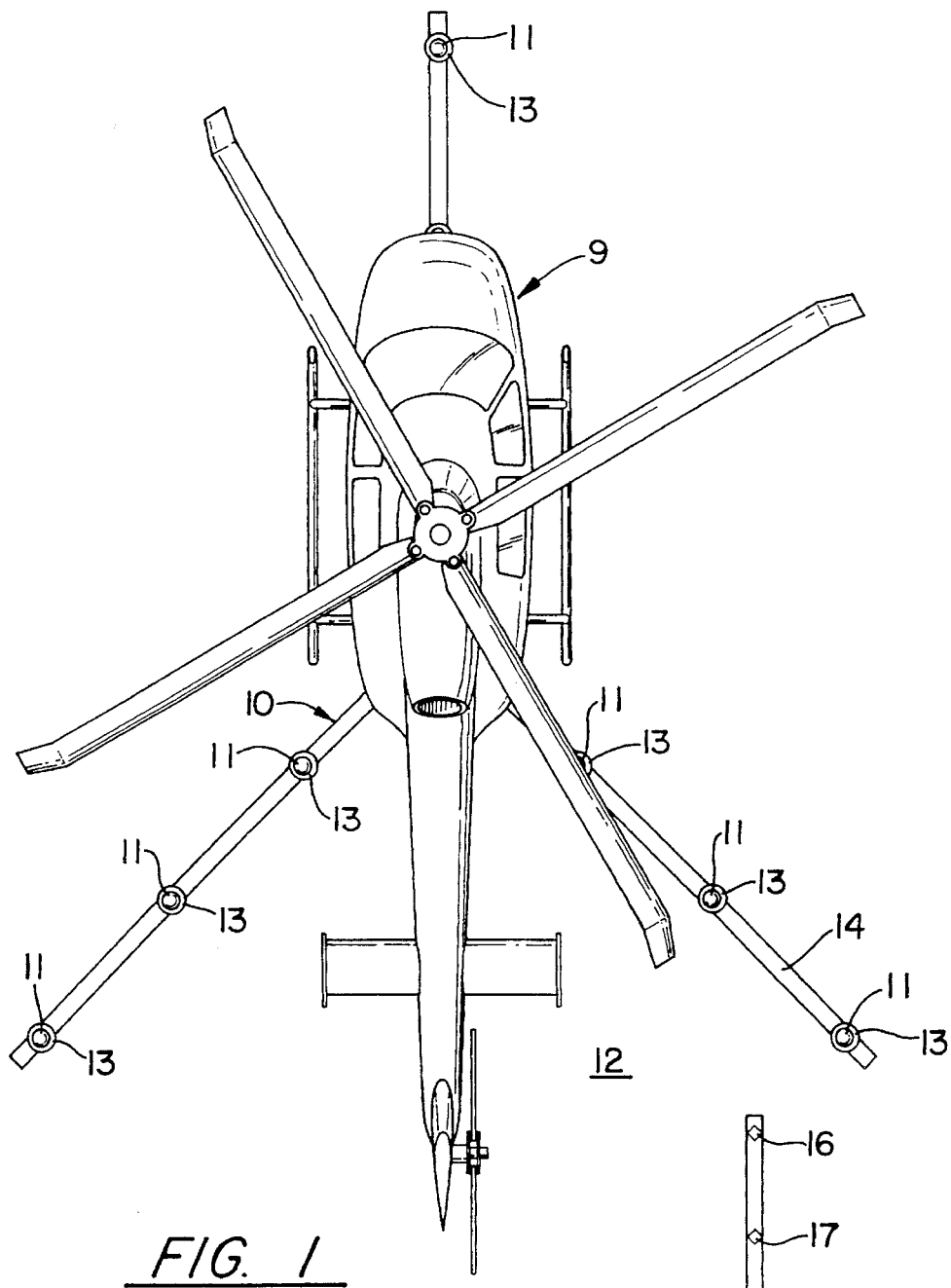
FIG. 1 is a top plan view of a helicopter which has landed with the assistance of landing site indication according to the present invention.

Referring now to FIG. 1, the purpose of the present invention is to assist the pilot of a helicopter 9 in locating a landing site selected by personnel on the ground, and to indicate the wind direction so as to promote a safe landing. The landing site indicator 10 of the invention consists of a plurality of light units 11 which are fastened to the ground 12 by means including mounting plates 13 at positions which may be indicated on a ribbon 14 by markers 15–18, FIG. 2, disposed thereon. That part of the ribbon having the markers 17 comprises the stem of a wye, and is set to point directly into the wind. When the pattern is established by fastening the ribbon 14 to the ground in some suitable fashion, the arms of the wye (containing the markers 18) are closer together than either of them is to the stem of the wye. This makes it possible for the pilot to discern which direction is up-wind as he makes an approach to a landing. The markers 15–18 may be anything suited to any particular embodiment of the invention, such as spots of ink or paint, different fabrics sewn to the ribbon 14, or grommets through the ribbon (which can assist fastening the ribbon to soft ground with stakes or the like). The ribbon 14 need not be in one piece, but could comprise three equal length pieces; or two pieces of equal length, and a longer third piece to form a stem. Or, a single piece of ribbon or the like (defined as anything portable that can indicate length of a stem and branches) may be used to successively lay out a pattern.

Figure 3:
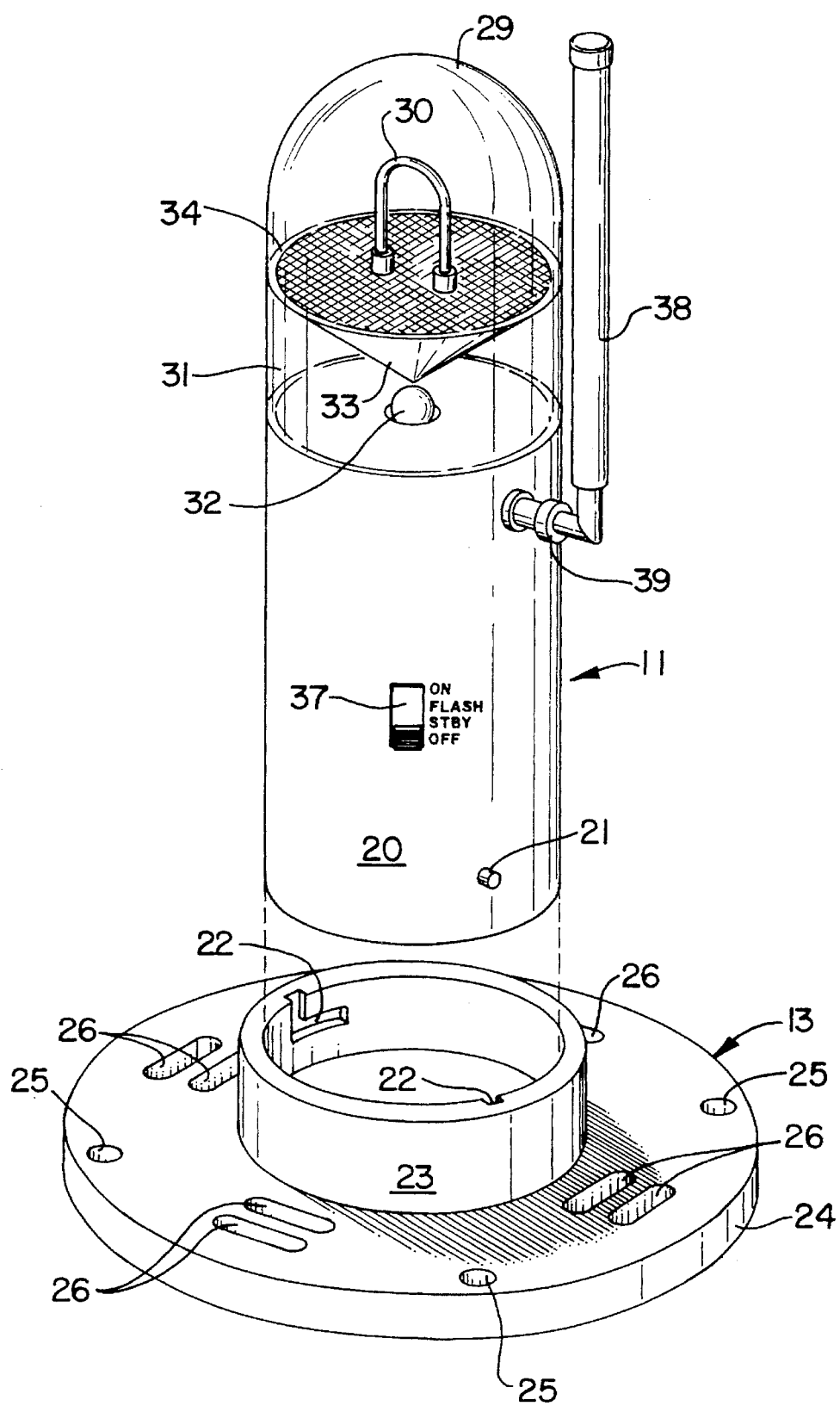
FIG. 3 is a perspective view of a radio operated, combination strobe/ring portable light unit for use, inter alia, in the landing site indication of FIG. 1.

Referring now to FIG. 3, one embodiment of the present invention employs a light unit 11 having a cylindrical body 20 with a pair of bayonets, only one bayonet 21 being shown in FIG. 3. The bayonets 21 fit into L-shaped slots 22 within a cylindrical socket portion 23 of the mounting plate 13. The cylindrical socket portion 23 joins a flange portion 24 which contains a plurality of holes 25 to receive nails 27 (FIG. 5) or other suitable stakes with which the mounting plate 13 can be secured to asphalt or earth. The flange portion 24 also has sets of strap slots 26 which facilitate use of lightweight cargo straps 28 (FIG. 5) in securing the flange portion 24 to any object adjacent the ground, in laying out the lights in the pattern described with respect to FIG. 1, or to objects such as utility poles which comprise a hazard (when a light unit 11 is being used other than for a landing site indicator).

Referring to FIG. 3, the light unit 11 has an upper, dome shaped lens 29 within which a xenon flash tube 30 is positioned, and a cylindrical lens 31 within which a halogen lamp 32 and an inverted cone reflector 33 are positioned, to provide a ring lamp. In operation, the xenon flash tube 30 is fired so that the light unit 11 acts as a brilliant strobe, to assist the pilot in locating the landing site, after which the pilot can change the operation of the light unit 11 (in a manner described with respect to FIG. 4 hereinafter) so as to terminate flashing of the xenon flash tube 30 and turn on the halogen lamp 32. When the lamp 32 is on, the reflector 33 directs most of the light radially outward and downward, thereby forming a ring of light on the ground surrounding the light unit 11. The lens 31 may comprise a cylinder, on the order of ¼ inch thick, and it will redirect some light upwardly, through an upward surface edge 34 thereof, thereby creating a small ring of light which, when viewed from above, is within a softer, larger ring of light on the ground formed by light emanating from the reflector 33. This provides the Y pattern to the pilot, while avoiding a blinding glare that would result from continuous operation of the xenon flash tube 30. As stated hereinbefore, the lenses 29, 31 may be of various colors or infrared.

The light unit 11 may be fashioned to contain three or four batteries for circuitry operating at about 4 volts total. However, it is preferred to fashion the light unit 11 so as to hold four batteries, which permits using four alkaline batteries of 1.5 volts each, totaling 6 volts, or four NiCad batteries of 1.2 volts each, totaling 4.8 volts. This provides the choice of using readily available D cells, or having the option of rechargeability.

To manually control operation of the light 11, a slide switch 37 can be adjusted between: an OFF position in which the batteries are disconnected; a standby position in which the pilot can control operation of the lights on the ground (in a manner described hereinafter); a flash position in which the xenon flash tube operates like a strobe, and an ON position in which the halogen lamp 32 is steadily lit. To receive commands from the approaching helicopter, a flexible antenna 38, of the same type commonly used on handy talkies, is provided with a rotatable mounting 39 so that it can be rotated from an upward, operating position shown in FIG. 3 downwardly by about 180°, so as to be in a storage/carrying position adjacent to the casing 20; it could have a standard connection, to allow it to be easily removed and re-installed.

Figure 4:
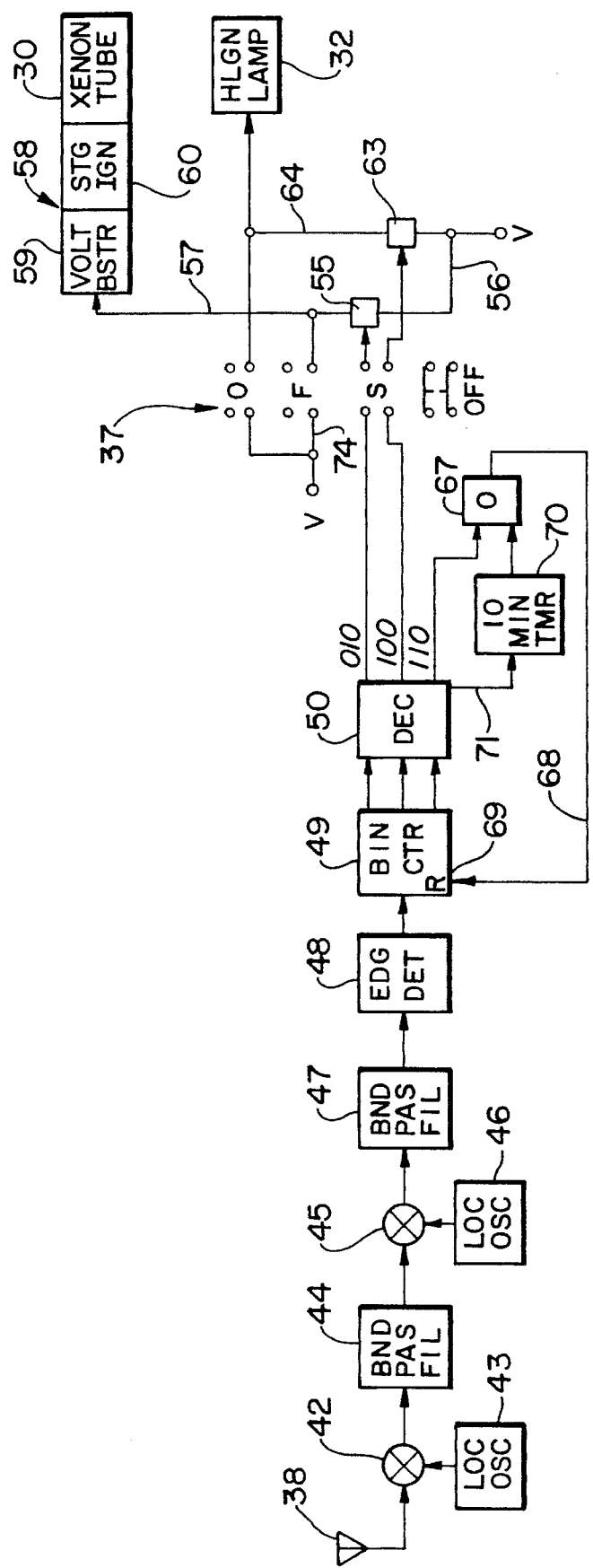
FIG. 4 is a simplified schematic block diagram of circuitry for operating the light unit of FIG. 3.

Referring now to FIG. 4, the antenna 38 is connected to a mixer 42, which also receives a signal from a first local oscillator 43. The output of the mixer 42 is passed through a band pass filter 44 to a second mixer 45 which also receives an input from a second local oscillator 46. The mixer 45 feeds a second band pass filter 47, the output of which is fed to a comparing edge detector 48, which provides a sharp output signal to a binary counter 49 whenever the input to the edge detector 48 exceeds a threshold magnitude. The binary counter 49 advances from a count of zero through successive binary counts, one step for each output of the edge detector 48. The output of the binary counter 49 is decoded into one of three signals by a binary decoder 50.

In FIG. 4, when the switch 37 is advanced from the OFF position, as shown, to the standby position (S, in FIG. 4), then the output of the decode circuit 50 can control the halogen lamp and the xenon tube. In the present embodiment, it is contemplated that the pilot will press his microphone switch twice, thereby causing two RF transmissions, each time that he wishes to change the operation of the light 11. In the preferred embodiment, it is contemplated that the pilot will be directed generally toward the landing site by means of GPS (global positioning satellite) coordinates or local land identification features. The pilot will then set the radio to either of the ordinary preset MAYDAY frequencies, 121.5 MHz or 243.0 MHz. These frequencies are available to all military and civilian agencies which might be utilizing the landing site indication of the present invention. The pilot can press his mike switch twice, thereby emitting two carrier pulses, with or without any voice modulation. However, keying the microphone without speaking into it will provide simply a carrier, which will not be intercepted as a call for help.

The signals received in the antenna 38 (FIG. 4) can be mixed with a signal from the local oscillator 43 of 182.25 MHz, thereby providing an output from the first mixer 42 at 60.75 MHz, regardless of which MAYDAY frequency is transmitted. The band pass filter 44 will have a very narrow pass frequency so as to avoid any spurious signals from passing therethrough. If the local oscillator 46 is provided with a 50.05 MHz frequency, the output of the second mixer 45 will be 10.7 MHz, which allows the use of common garage door and radio controlled vehicle circuitry, for the second band pass filter 47 and the edge detector 48.

The binary counter is caused to be reset at zero at the end of each use, so that receipt of two pulses will cause it to have an output of 010. With the switch 37 in standby, this will cause a FET or other suitable switch 55 to connect voltage from the battery source, V, over a line 56 and a line 57 to the circuitry 58 which operates the xenon flash tube 30. The circuitry 58 may comprise a voltage booster 59, and a standard storage and ignition circuit 60. The circuitry 60 is set to operate at a frequency of about two Hz so that the stroboscopic flashing of a plurality of light units 11 (as in the pattern of FIG. 1) will appear to the human eye as strobing in unison.

If the pilot depresses his microphone button twice more, the binary counter 50 will advance to a count of 100; with the switch 37 still in the standby position, this will cause a FET or other suitable switch 63 to connect voltage from the battery source, V, over the line 56 and a line 64 to the halogen lamp 32. Therefore, as the pilot thinks he is approaching the intended site, he will first activate his microphone button twice to cause the xenon flash lamps 30 to turn on, and once he is near the site, he will close the microphone button twice more to cause the softer halogen lamps to turn on in place of the flash tubes. If desired, he may thereafter close the microphone button twice more to cause the binary decoder 50 to advance to a setting of 110 to shut the lights off. This occurs by a 110 signal passing through an OR circuit 67 over a line 68 to a reset input 69 of the binary counter 49, to cause it to reset to a setting of all zeros. This will cause both of the switches 55, 63 to be open, so that no lamps are operating. On the other hand, the lights might be turned off automatically by a ten minute timer 70 which receives an output on a line 71 from the decoder 50. The output on the line 71 may be responsive to the turn off of the lowest order bit, so it will sense advancing from 001 to 010, as well as sensing when the count advanced from 010 through 011 to 100. In other words, 10 minutes after turning on either the xenon flash lamp or the halogen lamp, the ten minute timer 70 will cause the count to revert to zero and thereby shut either light off.

The slide switch 37 may also be manually advanced to the flash position (F, in FIG. 4) which causes voltage from the battery source, V, over a line 74 and the line 57 to operate the flash lamp. And, the slide switch 37 may be manually advanced to the ON position (O, in FIG. 4) to connect voltage from the battery source, V, over the line 74 and the line 64 to the halogen lamp 32.

Figure 2:
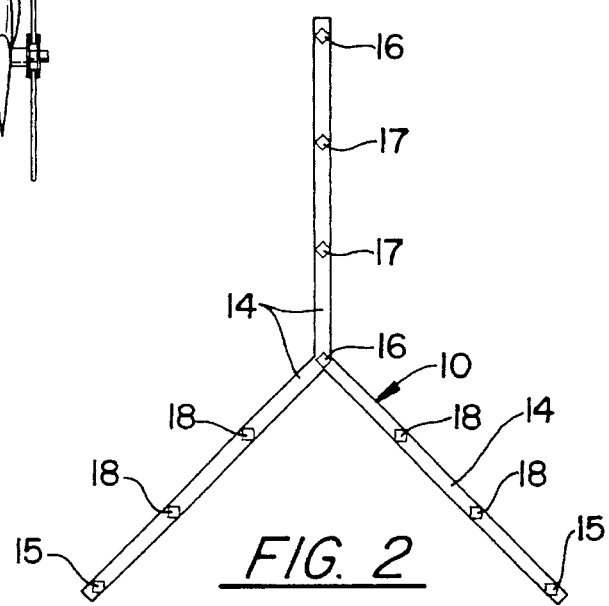
FIG. 2 is a top plan view of a pattern layout ribbon for setting up the landing site indication of FIG. 1.

Referring to FIG. 2, when laying out a pattern of lamps utilizing the pattern ribbon 14, it is not necessary to fasten the ribbon to the ground, but rather to fasten the lamps to the ground in positions indicated by the ribbon, which may also capture the ribbon between the lamp and the ground.

If desired, to emphasize wind direction, the lenses 29, 31 of the lamps in positions 15 and 18 may be of one color and the lamps in positions 16 and 17 may be of another color. Or, the lamps in positions 17 and 18 may be omitted, and only two lamps at position 15 of one color, and two lamps at position 16 of another color may be utilized to indicate wind direction.

Figure 5:
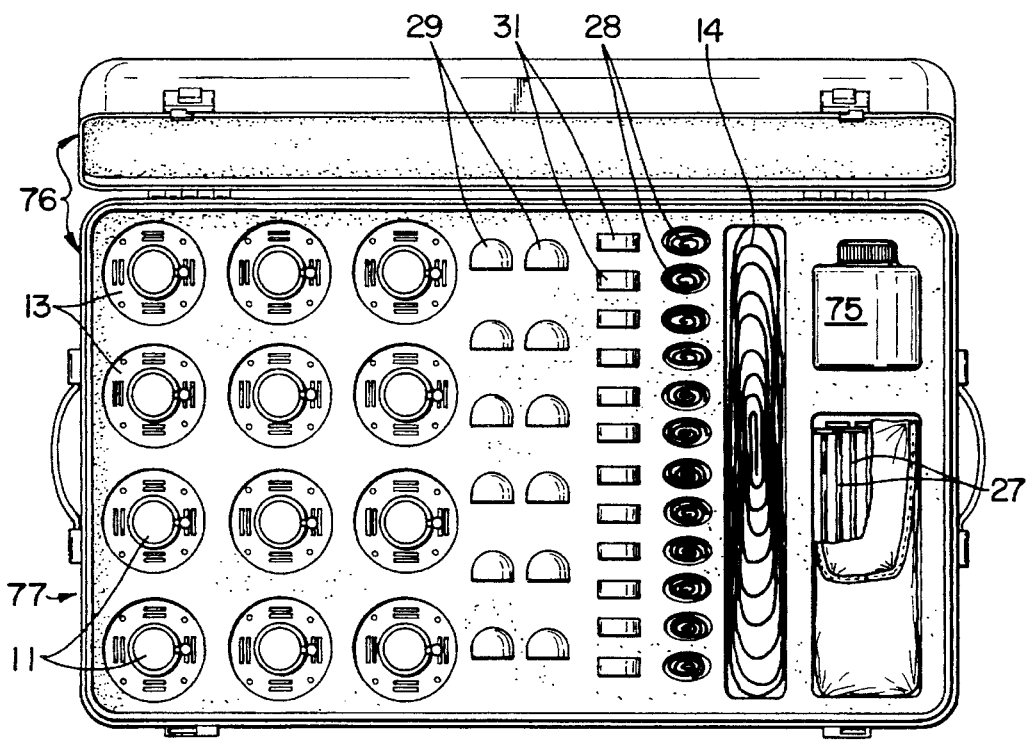
FIG. 5 is a stylized top plan view of a kit including a metal case with its top open containing the elements of the invention.

The mounting plate 13 (FIG. 3) may be secured to the ground through the holes 25 by stakes which may comprise ordinary heavy spikes 27 on the order of four or more1 inches long, which can be pushed or driven into terrain. The mounting plate 13 may also be fastened to any structure, brush or the like by utilization of straps, such as ordinary small cargo straps 28, through the slots 26. The mounting plate 13 may be secured to concrete or other hard surfaces by means of ordinary adhesive 75 (FIG. 5). The lamps, mounting plates, stakes, adhesive, straps, ribbon and various lenses may be packaged in a suitable container, such as a metal suitcase 76 (FIG. 5) or a backpack, as a kit. Of course, not all of the elements need be in any given kit 77.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A light unit comprising:

a flash tube disposed at the top of said light unit;

an incandescent lamp disposed beneath said flash tube;

a source of stroboscopic voltage for intermittently igniting said flash tube;

a power source;

control means for selectively connecting power to said source of stroboscopic voltage or to said incandescent lamp;

characterized by the improvement in which said control means includes:

a radio receiver; and means responsive to radio frequency (RF) radiation received by said receiver when said power source is not connected to said source of stroboscopic voltage or to said incandescent lamp for connecting power to said source of stroboscopic voltage to thereby cause said flash tube to provide a high intensity, intermittent light, and responsive to RF radiation received by said receiver when said power source is connected to said source of stroboscopic voltage to disconnect said power source from said source of stroboscopic voltage and connect said power source to said incandescent lamp, thereby to cause a steady, low intensity ring of light to emerge from and surround said light unit.

2. A light unit according to claim 1 wherein said incandescent lamp includes an inverted conical reflector disposed immediately beneath said flash tube and a lamp bulb disposed immediately beneath the apex of said reflector.

3. A light unit according to claim 1 wherein said control means comprises means including a binary counter for counting pulses of RF radiation received by said receiver;

a decoder for providing first and second signals in response to said counter respectively indicating a first predetermined count and a second predetermined count; and switch means responsive in the absence of both said first and second signals to disconnect said power source from said source of stroboscopic voltage and from said incandescent lamp, responsive to said first signal to connect said power source to said source of stroboscopic voltage, and responsive to said second signal to connect said power source to said incandescent lamp.

4. A light unit according to claim 1 wherein said radio receiver includes a local oscillator having a frequency midway between two standard distress frequencies.

5. A method of locating a landing site for a helicopter, comprising:

providing a plurality of light units that can each respond to radio frequency (RF) radiation to first, provide a high intensity, intermittent light from a flash tube and then, turn off said flash tube and provide a low intensity, steady light from an incandescent lamp;

arranging said light units in a pattern at a proposed landing site;

providing information to a helicopter to permit it to locate the general vicinity of said site;

flying the helicopter toward the vicinity of said site using said information;

transmitting RF radiation from the helicopter to turn on said flash tubes when in the general vicinity of said site;

flying the helicopter toward the light provided by said flash tubes;

transmitting RF radiation from the helicopter to turn off said flash tubes and turn on said lamps when close to said site;

and landing said helicopter at said site.

6. A method according to claim 5 wherein said step of arranging comprises:

arranging said light units in a wye-shaped pattern with the stem of said wye clearly distinguishable from the branches thereof, said wye being oriented with said stem pointing into the wind at said site.

7. A method according to claim 6 further comprising:

providing said light units with infrared lenses.

8. A method according to claim 6 further comprising:

providing at least one of said light units with lenses of a first color and at least two of said light units with lenses of a second color different from said first color; and said step of arranging comprises arranging said light units in a pattern using the color of said lens to indicate wind direction.

9. A method according to claim 8 wherein:

said step of providing comprises providing at least two of said light units with lenses of a first color and at least two of said light units with lenses of a second color different from said first color; and said step of arranging comprises arranging said light units with lenses of said first color in said stem of said wye pattern and arranging one of said light units of said second color in each of said branches of said wye pattern.

10. A method according to claim 6 wherein said step of arranging includes using a ribbon or the like to assist in determining the locations of said light units in said pattern.

11. A kit for use in identifying a landing site for a helicopter, consisting essentially of:

a plurality of light units, each having a flash tube at the top thereof, an incandescent lamp beneath said flash tube, and radio controlled means for selectively operating said flash tube or said incandescent lamp in response to radio frequency radiation received thereat;

a plurality of mounting plates, one for each of said light units, each for releasably engaging a light unit when in use, each having a flange with holes therein to permit passing spikes through said flange;

a plurality of stakes for insertion through said holes to fasten said mounting plates to penetrable surfaces at said site; and adhesive for fastening said mounting plates to impenetrable surfaces at said site.

12. A kit according to claim 11 including:

a plurality of straps; and wherein said flanges have slots therethrough to permit passing said straps through said flanges in using said straps to secure mounting plates to objects at said site.

13. A kit according to claim 11 including:

a ribbon to assist personnel in arranging said light units in a predetermined pattern at said site.

14. A kit according to claim 11 including colored lenses for mounting on said light units to alter the color of light emanating therefrom.

15. A kit according to claim 11 including infrared lenses for mounting on said light units to alter the color of light emanating therefrom.

16. A kit according to claim 11 wherein said radio controlled means includes a radio having a local oscillator of a frequency midway between two standard distress frequencies.

* * * * *